Figure 1:
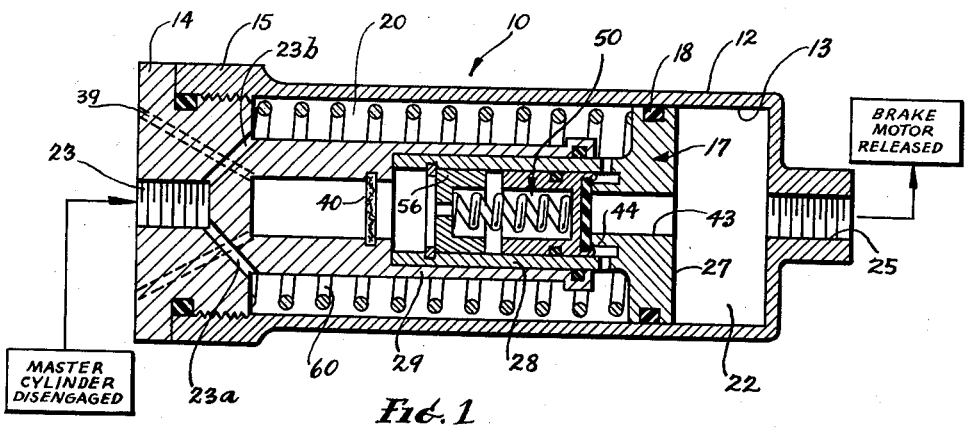

Feb. 2, 1960

B. G. OSWALT 2,923,132

HYDRAULIC AUTOMATIC ADJUSTING MECHANISM

Filed May 16, 1958

INVENTOR.
BURLIN G. OSWALT
BY *Jul. Haney*
ATTY.

United States Patent Office 2,923,132
Patented Feb. 2, 1960

2,923,132

HYDRAULIC AUTOMATIC ADJUSTING MECHANISM

Burlin G. Oswalt, Dayton, Ohio, assignor to The B. F. Goodrich Company, New York, N.Y., a corporation of New York Application May 16, 1958, Serial No. 735,751

4 Claims. (Cl. 60—54.5)

This invention relates to improvements in mechanisms for automatically adjusting hydraulic brakes to maintain a uniform release clearance between the engageable braking members and thereby provide a uniform pedal action for a braking system. The mechanism of this invention functions to effect such an adjustment by automatically metering hydraulic fluid to or from the hydraulic motor of a brake during successive actuations of the brake. Although the mechanism has special utility for brakes, it may be used advantageously for regulating hydraulic motors in environments other than brakes where the motors function under service conditions similar to brake motors.

The mechanism of this invention is a two-way adjuster. That is to say, it is adapted to compensate not only for wear of the brake linings but also for changes in the release clearance brought about by abnormal thermal expansion or resilient deflection of the braking members when the brake is engaged. The mechanism operates satisfactorily for both drum or disc-type brakes and is suitable for automotive brakes as well as for high energy aircraft brakes. The mechanism is also suitable for use with piston-type hydraulic motors and with diaphragm or expansible tube-type hydraulic motors.

The present invention is directed particularly to improvements in a mechanism for this same purpose disclosed and claimed in the copending application Serial No. 459,374, filed September 30, 1954, now Patent No. 2,835,111, of Burlin W. Oswalt. One of the features of the mechanism described in said Oswalt application Serial 459,374, now Patent No. 2,835,111, is a valve member which is operable to open in response to a predetermined pressure of fluid of either the pressure supply or the so-called "fluid link" leading from the adjuster mechanism to a brake motor to open and inner-communicate these fluids. That valve is preferably in the form of a piston-type valve which reciprocates in a region which is isolated from either of these fluids. If by some circumstance, fluid could leak into this isolated region, the reciprocation action of this valve member may be somewhat impeded, thereby impairing the efficiency of the adjusting mechanism.

According to this invention, the mechanism is designed so that the region in which this valve member reciprocates is not only sealed from communication with either the actuating fluid or "fluid link" but this region is also vented to the ambient region outside the mechanism. Hence, if under any circumstances the seals should fail allowing fluid to accumulate in this region, the accumulating fluid will be exhausted from this region to the surroundings. There is, accordingly, no possibility of impeding the action of the valve member by fluid leakage.

Figure 2:
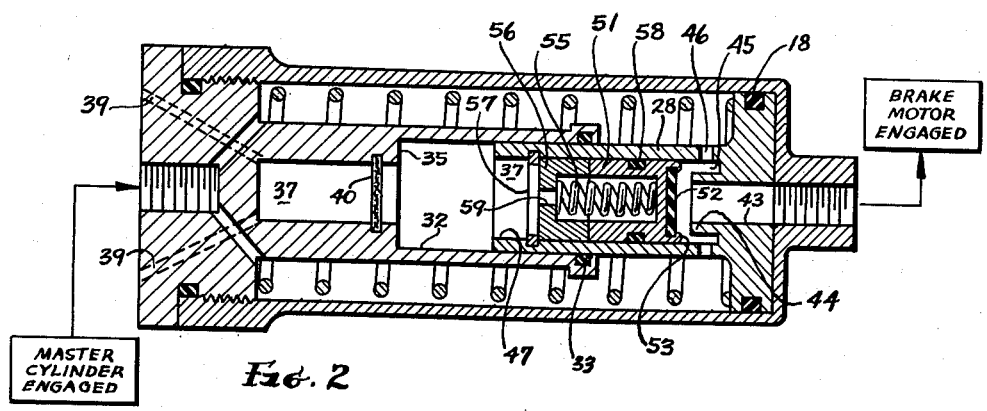

One preferred form of automatic adjusting mechanism embodying the improvements provided by this invention is shown in the accompanying drawing, in which:

In the drawing:

Fig. 1 shows an axial cross-sectional view of the mechanism when in the condition in which its associated brake motor is released; and Fig. 2 is a view similar to Fig. 1 but showing the mechanism in the condition when the associated brake motor is engaged.

The adjuster mechanism 10 is connected in series in a hydraulic line between a source of fluid pressure such as a master cylinder (not shown but merely indicated) and a brake motor (indicated schematically). In service certain of the interior regions of the mechanism (as hereinafter explained), together with the necessary pipes (not shown) to the mechanism from the pressure source and to the brake motor are normally filled with hydraulic fluid.

Structurally, the adjuster mechanism 10 comprises a cup-shaped outer casing 12 having central axial main bore 13 closed by an end cap 14 threaded into the open end of the casing against an annular sealing gasket 15.

Inside the main bore 13 is a main piston 17 which is sealed slidably against the bore by a dynamic O-ring seal 18.

The piston 17 divides the main bore 13 into an inlet chamber 20 to the left of the piston in Fig. 1 and an outlet chamber 22 to its right. The inlet chamber 20 is connected with fluid from the pressure source through an inlet 23 and diverging inlet ports 23a and 23b through the end cap 14. In response to the force exerted on the piston by the pressure of the inlet fluid, the piston 17 is urged rightward or toward the bottom of the casing 12 to discharge fluid in the outlet chamber 22 through an outlet 25 at the bottom of the casing to the fluid motor.

The piston 17 includes a forward pressure face 27 directed toward the outlet chamber and has an integral tubular housing 28 projected axially toward the inlet end of the casing. The latter extends telescopically inside a stationary tubular housing member 29 which is integral with end cap 14 and which projects axially through the center of the casing. The interior of the stationary tubular housing is counterbored near its extremity as at 32 (Fig. 2) to receive external surface of the piston housing 28 in snug fitting slidable engagement and is sealed against this housing by an O-ring 33. The counterbore 32 terminates at a shoulder 35 which acts as a stop to engage the piston housing 28 (as in Fig. 1) to limit the movement of the piston leftward toward the inlet connection.

The coaxial interior regions 37 of both the fixed inner housing 29 and the piston housing 28 are in communication with each other and this region is vented to the outside of the casing 12 through a pair of holes 39 through the end cap 14. In the narrower center portion of the fixed housing 29 near shoulder 35 there is a strainer 40 which prevents dirt from entering the counterbore 32.

Through the center of piston 17 there is an axial port 43 leading from the forward pressure face 27 into the interior of the piston housing 28. Surrounding the mouth of the port inside the housing is an annular valve seat 44, (Fig. 2) which is in turn circled by an annular groove 45. The groove 44 is in communication with the fluid of the inlet chamber at all times through radial passages 46 formed through the piston housing 28, near its junction with the main body of the piston.

The internal surface 47 of the piston housing 28 is bored to receive a pressure-sensing valve unit 50 seated in this bore. The pressure-sensing valve unit 50 includes a cup shaped pressure-sensing piston valve member 51 having a resilient rubber covered sealing disc 52 on its front face adapted to engage the valve seat formed by wall 44 as shown in Fig. 1. The rubbber sealing disc 52 is secured to the piston valve 51 by rolling marginal flanges 53 on the forward face of the valve member inwardly over the margins of the rubber disc.

The piston valve 51 is biased in the housing 28 toward a closed position against the valve seat 44 by a spring 55 which is caged between the piston valve and anchor cup 56 seated inside the piston housing 28 against a snap ring 57. The anchor cup 56 is spaced axially from the piston valve 51 as in Fig. 1 when the valve 51 is closed and is adapted to restrict the travel of valve 51 by engaging the valve as in Fig. 2 when the piston valve is displaced to its open position.

The pressure-sensing valve 51 is maintained in sealed sliding engagement with the internal bore 47 of the piston housing 28 by a peripheral O-ring 58. The region within the cup shaped piston valve 51 is in communication through an opening 59 in the anchor cup 56 with the region 37 inside the telescoping tubular housings 28 and 29 which in turn is vented as previously noted through openings 39 to the surroundings outside the casing. These latter regions are maintained sealed off from the fluid in the inlet and outlet chambers by O-ring 58 and are empty of fluid to avoid impeding the movement of the piston valve 51. Even though some fluid might leak past the O-ring 58 such fluid could pass through the regions 37 and the vent openings 39.

In the closed position of the pressure-sensing piston valve 51 its inwardly rolled marginal regions 53 are in communication with the fluid and the annular groove 45 which in turn is in communication with the inlet fluid through the series of passages 46. This margin 53 serves as an annular hydraulic actuating surface for the piston valve when the valve is closed and is in response to a predetermined pressure of the inlet chamber fluid in groove 45 to force the valve 51 open against the opposition of its biasing spring 55. The pressure-sensing piston valve 51 is also capable of opening in response to fluid pressure in the outlet chamber 22 acting through the center port 43 against the center portion of the disc 52 of the pressure-sensing valve 51.

During periods when the brake mechanism is disengaged as is the situation in Fig. 1, the main piston 17 is lodged in its left position in Fig. 1 with its tubular housing 28 seated against shoulder 35 inside the fixed housing and with its pressure-sensing piston valve 51 closed tightly against valve seat 44. Hence, the so-called "fluid link"—the fluid in the outlet chamber 22 and that fluid in the line (not shown) connecting the outlet chamber to the brake motor is entirely isolated from the inlet chamber fluid which, under these circumstances, may be at zero pressure or at the back pressure at the supply system.

In the released position of Fig. 1, the main piston is also biased rightward against the fluid in the outlet chamber 22 by a main spring 60 which is caged inside the casing in the inlet chamber concentrically about the fixed housing 29. The biasing force exerted by spring 60 against the main piston 17 under these conditions is less than the opposing back pressure on the piston exerted through the fluid link by retractor springs (not shown) of the associated brake mechanism. Accordingly, the latter maintains the piston assembly in its leftward position in Fig. 1 throughout a period in which a brake is disengaged.

The adjusting mechanism is preferably designed so that the volume of fluid in its outlet chamber 22 is substantially equal to the volume of fluid required to operate the brake motor to engage the brake shoes (not shown) with the drum when there is a predetermined release clearance between the shoe and the drum. Thus if the brake shoes are initially spaced at the uniform or standard clearance desired, then when the brake system is pressurized, the main piston 17 will "bottom" in casing 12 as in Fig. 2 at substantially the same time the shoes firmly engage the drum. As soon as, or close to the time piston 17 bottoms, the pressure of the inlet fluid will rise to the full rated pressure of pressure source and is transmitted through passages 46 and groove 45 to act against annular margin 53 and thus force open piston valve 51. Ordinarily, there will be little or no flow of inlet fluid thru seat 44 into port 43 immediately after valve 51 opens because the pressure in the fluid link will then equal the inlet pressure. Throughout a period in which the brake is engaged, the pressure-sensing piston valve 51 stands open so that the pressure source is in direct communication with the brake motor via the inlet chamber 20, passages 46, groove 45, port 43 and outlet 25.

If the brake is released before there is any substantial wear on the linings or distortion of the brake members, piston valve 51 snaps shut immediately upon release of the inlet pressure to isolate the fluid link from the inlet fluid. Then as the brake shoes are retracted, piston 17 is returned to its position of Fig. 1 of the drawings with the volume of fluid in the fluid link unchanged.

If, however, during the period in which the brake is engaged there is wear occurring in the brake linings and/or any expansion of the brake drum, such conditions tend to relieve pressure of the fluid link and therefore there results a corresponding flow of fluid from the inlet side of piston 17 through passages 46 and port 43 into the fluid link until full line pressure is restored in the fluid link. The volume of the fluid link is progressively increased in this manner and the brake shoes are thereby stepped forward against the drum to compensate for the wear and/or expansion occurring during a braking operation. The fluid added to the fluid link through port 43 to compensate for wear or expansion is trapped in the fluid link by the closing of valve 51 as soon as the brake is released. Then, when the main piston 17 is retracted to its leftward position of Fig. 1 when the brake is released, the added volume of fluid trapped in the fluid link relocates the release position of the brake shoe (not shown) relative to the brake drum to maintain the desired predetermined release clearance.

In cases where the brake drum undergoes substantial thermal expansion, the brake shoe may be adjusted outwardly in the foregoing manner so that it will remain in firm engagement with the drum throughout the period the brake is applied. When the brake is released the brake shoe will be retracted the usual uniform distance from the drum. The subsequent cooling of the brake drum, however, will materially reduce this release clearance and under some conditions the contraction will be of sufficient magnitude to cause the drum to exert intense constricting force on the brake shoe.

In the event the drum shrinks enough to exert such force in the system shown in Figs. 1 and 2, such force will produce a corresponding increase in pressure in the fluid link which will act through port 43 against the center of valve 51 and eventually force open this valve. Thus, some of the fluid in the fluid link can bleed off through passage 46 and groove 44 and passages 46 into the inlet chamber 20 until pressure in the fluid link is relieved and the brake shoe is in light dragging contact with the brake drum. These events usually occur while the piston assembly is in its rightward position in Fig. 1 and this backflow can occur because the fluid in the inlet chamber 20 under these circumstances is at the back pressure of the braking system, usually atmospheric pressure.

Whether the shrinkage of the drum after release merely brings about a slight reduction in the release clearance, or whether it is such as to result in a constricting force on the brake shoes to force open valve 51 described in the next preceding paragraph, the desired release clearance between the brake shoes and the brake drum may be automatically restored by merely depressing the brake pedal momentarily after the brake members have cooled to ambient temperature and resumed their normal locations.

When the brake pedal is depressed to re-set the release clearance, the main piston 17 is displaced forwardly until the brake shoe is firmly engaged with the drum in the manner explained previously. However, since the release clearance existing when the pedal is depressed under these circumstances is much less than the normal release clearance, the shoes will be firmly pressed against the brake drum substantially before the piston 17 bottoms as in Fig. 2. But, as soon as the shoes are engaged, regardless of the particular axial position of main piston 17 in casing 12, the piston valve 51 is forced open by the inlet pressure exerted against its peripheral margin 53. Thereafter, although the pressure of the fluid acting against the opposing sides of piston 17 is balanced and the opposing surface areas of piston 17 are equal, the piston 17 is moved translationally rightward through the fluid link by the force exerted on it by main spring 60 until the piston 17 eventually is bottomed in casing 12 as shown in Fig. 2. During this movement the volume of the fluid link is reduced by the amount of fluid spilling backward through port 43 while the piston assembly is advanced by spring 60. Thereafter, as soon as the pedal or master cylinder pressure is released, piston valve 51 instantly snaps shut and the main piston 17 retracts to its position shown in Fig. 1 so that the desired release clearance is restored between the brake shoes and the brake drum.

In view of the foregoing operation of the mechanism, it may be seen that within the range of operation of the brake motor, the brake shoes may be maintained in engagement with the brake drum no matter how much the drum expands. And by the same token, the brake is automatically restored to accurate adjusted condition following a severe brake application by merely depressing the brake pedal momentarily. Inasmuch as valve 51 may be forced open by a predetermined pressure in the fluid link, it is not possible to have the brake become locked as a result subsequent shrinkage of the drum following an over adjustment of the brake.

It may be noted that pressure-sensing piston valve 51 is operative to open in response to either a predetermined pressure in the inlet chamber 20, or a predetermined pressure of fluid in the outlet chamber 22 sufficient to overcome valve spring 55. Usually valve 51 is opened when the piston 17 is bottomed by the pressure on the inlet chamber acting on marginal surfaces 53 of the valve. Whenever pressure of fluid in the outlet chamber 22 (i.e. the fluid link) reaches a predetermined value, however, this fluid can act directly on the central region of the valve 51 exposed through port 43 to force valve 51 open. The valve 51 may be either open or closed during rightward travel of piston 17 but it is always closed during leftward or retraction stroke of piston 17.

Variations in the constructions disclosed may be made within the scope of the appended claims.

I claim:

1. Hydraulic adjusting mechanism comprising a casing member, an actuated member movable in said casing member in sealing engagement with the interior of the casing member and defining with the casing member a first chamber to receive fluid for actuating said actuated member and a second chamber to contain fluid displaceable by the actuated member, means biasing said actuated member continuously toward said second chamber, said casing member and said actuated member including tubular members interfitting each other for telescopic engagement during the movement of said actuated member, means for venting the interior of said tubular members to regions outside the casing, a port in said actuated member leading from said second chamber and into and terminating at a mouth inside the interior of said tubular member of said actuated member, valve means housed in the innermost one of said telescoping tubular members, said valve means including means biasing said valve means toward a position to close said mouth of said port, and a pressure-responsive surface on said valve means to displace the valve from said mouth, a passage in said actuated member leading from said first chamber to communicate fluid from said first chamber to said pressure-responsive surface of said valve means, and said valve means being movable toward said vent means in said vented region of said tubular members to open said port in response to a predetermined pressure of fluid in either said first chamber acting through said passage or said second chamber acting through said port.

2. In a hydraulic adjusting mechanism in which an actuated member is disposed for reciprocation in a casing member between a fluid inlet and a fluid outlet connection and is biased continuously toward the outlet connection, and the actuated member including passage means for communicating fluid on its opposite sides and a valve normally closing said passage means but having separate actuation surfaces thereon responsive, respectively, to inlet fluid and outlet fluid to open said valve, the improvement comprising a first tubular member fixed rigidly in the casing member longitudinally thereof, a second tubular member carried on said actuated member and interfitting with said first tubular member for telescopic sealed slidable movement, and means venting the interiors of both said telescoping tubular members to a region outside said casing, the innermost of said telescoping tubular members having a bore, and said valve member including a piston member slidable in said bore, said piston member of the valve being slidable toward said vent means in the interior of said telescopic members when said valve is actuated to open said passage.

3. Hydraulic adjusting mechanism comprising a cylinder, a main piston therein defining with said cylinder axially spaced fluid chambers, said main piston having a forward face and a rearward face adapted for communication respectively with fluid in the chambers adjacent said faces, a spring biasing said main piston toward fluid in the chamber adjacent said forward face, a tubular housing fixed in said cylinder longitudinally thereof, means for venting the interior of said fixed tubular housing to a region outside the cylinder, a tubular housing on said main piston fitting telescopically into said fixed tubular housing for reciprocation therein during the movement of said piston and being in communication with said vented region of the fixed housing, a port through said piston from said forward face and opening into said piston tubular housing, a piston valve reciprocable inside said vented piston housing and having a sealing face adapted for closing said port and means biasing said piston valve toward a closed position on said port, an actuating surface on said piston valve responsive to fluid pressure to displace said piston valve by overcoming said valve bias means, and a passage opening into said piston tubular housing to communicate said actuating surface with fluid acting against said rearward face of the main piston when said port is closed, said piston valve being operable in response to a predetermined pressure of fluid acting on either said rearward face through said passage, or said forward face of the main piston through said port to open said port and thereby intercommunicate fluid acting on said forward and rearward faces of the main piston.

4. In a hydraulic adjusting mechanism a casing member, an actuated member movable in said casing member in sealing engagement with the interior of the casing member and defining with the casing member a first chamber to receive fluid for actuating said actuated member and a second chamber to contain fluid displaceable by the actuated member, said casing member and said actuated member including integral tubular housings interfitting each other for sliding sealing telescopic engagement during movement of said actuated member, means for venting the interior of said telescoping tubular members to regions outside the casing, a port through said actuated member from said second chamber and opening into the interior of said telescoping tubular members, a valve seat at the mouth of said port inside said tubular members, a piston valve slidable in the interior of the telescopically innermost tubular member, said piston valve having a face portion directed toward said valve seat, a spring for biasing said piston valve toward a closed position on said valve seat, said face portion of said piston valve including a center region engageable with said valve seat to cover and close said port and said face portion including an annular hydraulic-actuating surface for said piston valve radially outward from said center region, said actuation surface together with adjacent portions of said actuated member and the tubular member thereof surrounding said valve seat forming an annular channel adapted to contain hydraulic fluid when the valve is closed, and a passage in said actuated member opening into said channel from said first chamber to communicate actuating fluid to said annular actuation surface, said piston valve being operable to open and connect said first and second chambers either in response to a predetermined pressure of fluid in said second chamber acting through said port on said center region of the valve face, or in response to a predetermined pressure of fluid in said first chamber acting through said channel on said annular actuation surface of the valve face.

References Cited in the file of this patent
UNITED STATES PATENTS

| | | |
|---|---|---|
| 2,474,749 | Miller | June 28, 1949 |
| 2,488,433 | Porter | Nov. 15, 1949 |
| 2,513,015 | Fike | June 27, 1950 |
| 2,835,111 | Oswalt | May 20, 1958 |

FOREIGN PATENTS

| | | |
|---|---|---|
| 711,336 | Great Britain | June 30, 1954 |